(12) United States Patent
Hosokai et al.

(10) Patent No.: US 11,325,218 B2
(45) Date of Patent: May 10, 2022

(54) WORM POLISHING METHOD AND DEVICE THEREOF

(71) Applicant: SANSHIN CO., LTD., Nagaoka (JP)

(72) Inventors: Koji Hosokai, Nagaoka (JP); Takayuki Adachi, Nagaoka (JP)

(73) Assignee: SANSHIN CO., LTD., Nagaoka (JP)

( * ) Notice: Subject to any disclaimer, the term of this patent is extended or adjusted under 35 U.S.C. 154(b) by 611 days.

(21) Appl. No.: 16/192,855

(22) Filed: Nov. 16, 2018

(65) Prior Publication Data
US 2019/0232454 A1    Aug. 1, 2019

(30) Foreign Application Priority Data

Jan. 31, 2018   (JP) .............................. JP2018-015018

(51) Int. Cl.
| | |
|---|---|
| *B23F 1/02* | (2006.01) |
| *B23F 19/12* | (2006.01) |
| *B24B 21/02* | (2006.01) |
| *B24B 21/16* | (2006.01) |
| *B24B 21/08* | (2006.01) |
| *B24B 21/12* | (2006.01) |
| *B24B 21/22* | (2006.01) |

(Continued)

(52) U.S. Cl.
CPC .............. *B24B 21/002* (2013.01); *B23F 1/02* (2013.01); *B23F 19/12* (2013.01); *B24B 21/004* (2013.01); *B24B 21/006* (2013.01); *B24B 21/02* (2013.01); *B24B 21/08* (2013.01); *B24B 21/12* (2013.01); *B24B 21/16* (2013.01); *B24B 21/22* (2013.01); *B24B 27/0084* (2013.01); *B24B 41/061* (2013.01); *B23F 19/00* (2013.01); *B23F 21/02* (2013.01); *B24B 21/18* (2013.01)

(58) Field of Classification Search
CPC ... B24B 21/002; B24B 21/004; B24B 21/006; B24B 21/02; B24B 21/08; B24B 21/12; B24B 21/16; B24B 21/18; B24B 21/22; B24B 27/0084; B24B 41/06; B24B 41/066; B23F 1/02; B23F 19/00; B23F 19/12
USPC .................................. 451/47, 303, 304, 307
See application file for complete search history.

(56) References Cited

U.S. PATENT DOCUMENTS

| | | | | |
|---|---|---|---|---|
| 2,823,494 | A * | 2/1958 | Board, Jr. ............. | B24B 21/006 451/47 |
| 2,843,977 | A * | 7/1958 | Kuhns ...................... | B23F 5/02 451/304 |

(Continued)

FOREIGN PATENT DOCUMENTS

| | | |
|---|---|---|
| CN | 101288945 A | 10/2008 |
| CN | 202137669 U | 2/2012 |

(Continued)

*Primary Examiner* — Eileen P Morgan
(74) *Attorney, Agent, or Firm* — Bacon & Thomas, PLLC

(57) ABSTRACT

Loopback rolls which can transfer and guide a polishing tape (T) along a perimeter of a pressure contact roll (R) is provided, the pressure contact roll having a tapered peripheral edge having a top edge and a pair of slant edge faces formed on a periphery of the pressure contact roll, by which the polishing tape can be bent into a substantially V-shape in cross section, and a switchable pressure contact mechanism is switchably provided which pressure contacts each of bent portions of the polishing tape, which is bent into the substantially V-shape in cross section by the tapered peripheral edge, to one tooth face (B1) or the other tooth face of a worm.

6 Claims, 13 Drawing Sheets

(51) Int. Cl.
   *B24B 21/00*   (2006.01)
   *B24B 27/00*   (2006.01)
   *B24B 41/06*   (2012.01)
   *B23F 21/02*   (2006.01)
   *B23F 19/00*   (2006.01)
   *B24B 21/18*   (2006.01)

(56) References Cited

U.S. PATENT DOCUMENTS

| | | | | |
|---|---|---|---|---|
| 5,865,669 | A | * | 2/1999 | Kiriyama ................ B24B 19/12 |
| | | | | 451/168 |
| 2015/0056893 | A1 | * | 2/2015 | Hosokai .................. B24B 21/22 |
| | | | | 451/47 |
| 2015/0375357 | A1 | * | 12/2015 | Chen ..................... B24B 21/008 |
| | | | | 451/303 |
| 2018/0056472 | A1 | * | 3/2018 | Hosokai .................. B24B 21/16 |

FOREIGN PATENT DOCUMENTS

| | | |
|---|---|---|
| CN | 206066152 U | 4/2017 |
| JP | S61-56820 A | 3/1986 |
| JP | 4442011 B2 | 3/2010 |

\* cited by examiner

WORM POLISHING METHOD AND DEVICE THEREOF

TECHNICAL FIELD

The present invention relates to a worm polishing method which is used at the time of polishing each of tooth faces of a worm with a polishing tape, and a device thereof.

BACKGROUND ART

Conventionally, as a worm polishing device of this kind, there has been known a worm polishing device which has a structure in which polishing is carried out, with a grinding surface of a conical grinding wheel being conformed to generation of a tooth face of a worm.

CITATION LIST

Patent Literature

PATENT LITERATURE 1: Japanese Unexamined Patent Publication No. 61-56820

SUMMARY OF INVENTION

Technical Problem

However, in the case of the above conventional structure since the conventional structure has the structure in which the tooth face is polished by grinding using a grinding wheel, the conventional structure entails a disadvantage that it is liable to be subject to restrictions in the improvement of surface roughness of the tooth face of the worm which is mutually in sliding contact with a worm wheel.

Solution to Problem

The present invention is made to solve the above disadvantage, and out of the present inventions, the invention of a method according to a first aspect of the present invention is a worm polishing method comprising the steps of: rotatably retaining a worm and rotating the worm with an axis of the worm as the center when polishing a tooth face of the worm with a polishing tape; continuously or intermittently transferring the polishing tape; inserting and retracting the polishing tape into and from a tooth space between opposite tooth faces of the worm by a pressure contact roll, wherein a rotational axis of the pressure contact roll is tilted corresponding to a tooth lead angle of the tooth space of the worm, and the polishing tape is transferred and guided along a perimeter of of the pressure contact roll; linearly swinging the pressure contact roll in a tangential direction of the tooth space of the worm orthogonal to the rotational axis, wherein the pressure contact roll has a tapered peripheral edge defined by a top edge and a pair of slant edge faces on a periphery of the pressure contact roll, and the polishing tape is bent into a substantially V-shape in cross section by the tapered peripheral edge of the pressure contact roll forming a bent portion of the polishing tape along each of the slant edges; switchably advancing and retreating the pressure contact roll in a rotational axis direction, and switchably pressure contacting each of bent portions of the polishing tape to each of one tooth face or the other tooth face on opposite sides of the tooth space of the worm; moving the polishing tape in an axial direction of the worm; synchronizing a rotating speed of the worm with a moving speed of the polishing tape corresponding to a lead of the tooth space of the worm; and polishing the tooth faces of the worm by a combined operation of the rotation of the polishing tape, the transfer of the polishing tape, the linear swing motion of the polishing tape in the tangential direction of the tooth space of the worm, and the movement of the polishing tape synchronized with the rotating speed of the worm.

Further, the invention of a device according to a second aspect of the present invention is a worm polishing device comprising: a retention mechanism which rotationally retains a worm; a rotation mechanism which rotates the worm with an axis as the center; a tape transfer mechanism which continuously or intermittently transfers a polishing tape; a tape insertion and retraction mechanism which advances and retreats the tape transfer mechanism, and inserts and retracts the polishing tape into and from a tooth space between opposing tooth faces of the worm with a pressure contact roll; a tilting mechanism which tilts a rotational axis of the pressure contact roll corresponding to a tooth lead angle of the tooth space of the worm; loopback rolls which can transfer and guide the polishing tape along a perimeter of the pressure contact roll, wherein the pressure contact roll has a tapered peripheral edge defined by a top edge and a pair of slant edge faces on a periphery of the pressure contact roll, and the polishing tape is bent into a substantially V-shape in cross section by the tapered peripheral edge of the pressure contact roll forming a bent portion of the polishing tape along each of the slant edges; a swing mechanism which linearly swings the pressure contact roll in a tangential direction of the tooth space of the worm orthogonal to the rotational axis; a switchable pressure contact mechanism which switchably advances and retreats the pressure contact roll in a rotational axis direction to switchably pressure contact each of the bent portions of the polishing tape to each of one tooth face or the other tooth face of the worm; a tape moving mechanism which moves the polishing tape in an axial direction of the worm; and a speed synchronization means which synchronizes a rotating speed of the worm with a moving speed of the polishing tape corresponding to a lead of the tooth space of the worm.

Further, the invention of the device according to a third aspect of the present invention is configured such that an elastic pressure contact ring member which is provided on the tapered peripheral edge of the pressure contact roll, and has the top edge face and the pair of slant edge faces, by both of which the polishing tape can be bent into the substantially V-shape in cross section. Furthermore, the invention of the device according to a fourth aspect of the present invention is configured such that the switchable pressure contact mechanism comprises a pressure contact roll, a switchable moving stand, and a pair of opposing cylinder mechanisms, and wherein the pressure contact roll is provided on the switchable moving stand, the switchable moving stand is advancably and retreatably provided in the rotational axis direction of the pressure contact roll, and the pair of opposing cylinder mechanisms advance and retreat the switchable moving stand.

Further, the invention of the device according to a sixth aspect of the present invention is configured such that the speed synchronization means comprises a rotation control motor rotating the worm, a movement control motor moving the polishing tape, and a synchronization control portion which synchronously controls a rotating speed of the rotation control motor and a rotating speed of the movement control motor.

Effect of the Invention

The present invention is configured as above. According to the inventions described in the first and second aspects of the present invention, the worm is rotatably retained by the retention mechanism, and the worm is rotated with the axis as the center by the rotation mechanism. The polishing tape is transferred continuously or intermittently by the tape transfer mechanism, and the polishing tape is inserted into the tooth space of the worm by the pressure contact roll by means of the tape insertion and retraction mechanism, the rotational axis of the pressure contact roll is tilted by the tilting mechanism corresponding to the tooth lead of the tooth space of the worm, and the polishing tape is transferred and guided by the loopback rolls in the tangential direction of the pressure contact roll. The pressure contact roll is linearly swinged by the swing mechanism in the tangential direction of the tooth space orthogonal to the rotational axis. The pressure contact roll has a tapered peripheral edge defined by a top edge and a pair of slant edge faces on a periphery of the pressure contact roll, and the polishing tape is bent into a substantially V-shape in cross section by the tapered peripheral edge of the pressure contact roll forming a bent portion of the polishing tape along each of the slant edges, and each of the bent portions of the polishing tape is pressure contacted to each of the one tooth face and the other tooth face of the worm by switchably advancing and retreating the pressure contact roll in the rotational axis direction. The polishing tape is moved by the tape movement mechanism in the axial direction of the worm, and the rotating speed of the worm and the moving speed of the polishing tape are synchronized by the speed synchronization means corresponding to the lead of the tooth space of the worm, and the tooth face of the worm can be polished by the polishing tape by the combined operation of the rotation of the worm, the transfer of the polishing tape, the linear swing motion in the tangential direction of the tooth space, and the movement of the polishing tape synchronized with the rotating speed of the worm. As a result, the polishing tape moves in conformity to the lead of the tooth space of the worm by the movement of the polishing tape which is synchronized with the rotating speed of the worm, and the polishing tape is securely pressure contacted to the tooth faces of the worm by the tape insertion and retraction mechanism and the switchable pressure contact mechanism. Therefore, the continuous and intermittent transfer of the polishing tape and linear swing motion of the polishing tape in the tangential direction of the tooth space of the worm enable secure polishing of the worm by the polishing tape, thereby improving polishing accuracy. This improves the surface roughness of the tooth faces of the worm, and polishing workability of the tooth faces of the worm.

Further, according to the invention described in the third aspect of the present invention, an elastic pressure contact ring member which is provided on the tapered peripheral edge of the pressure contact roll, and has the top edge face and the pair of slant edge faces, by both of which the polishing tape can be bent into the substantially V-shape in cross section. Therefore, this buffers the pressure contact force between the bent portion and the tooth face of the worm by the slant edge face of the polishing tape, which improves the surface roughness of the tooth face, thereby allowing good polishing of the tooth face of the worm. Moreover, according to the invention described in the fourth aspect of the present invention, the switchable pressure contact mechanism comprises a pressure contact roll, a switchable moving stand, and a pair of opposing cylinder mechanisms which advance and retreat the switchable moving stand, the pressure contact roll is provided on the switchable moving stand, and the switchable moving stand is advancably and retreatably provided in the rotational axis direction of the pressure contact roll. Therefore, this enables switchable advance and retreat of the pressure contact roll in the rotational axis direction by the pair of the opposing cylinder mechanisms, and switchable pressure contact of each of the bent portions of the polishing tape which is bent into the V-shape in cross section to each of the one tooth face or the other tooth face of the worm, thereby allowing good pressure contact of the polishing tape to the one tooth face or to the other tooth face. Further, according to the invention described in the fifth aspect of the present invention, the above swing mechanism comprises the eccentric mechanism which linearly swings the pressure contact roll in the tangential direction of the tooth space orthogonal to the rotational axis. Therefore, this simplifies the structure thereof.

Further, according to the invention described in the sixth aspect of the present invention, the speed synchronization means comprises a rotation control motor rotating the worm, a movement control motor moving the polishing tape, and a synchronization control portion which synchronously controls a rotating speed of the rotation control motor and a rotating speed of the movement control motor. Therefore, this enables synchronization of the rotating speed of the worm with the moving speed of the polishing tape corresponding to the lead of the tooth space of the worm, which allows secure contact movement of the polishing tape in conformity to the lead of the tooth space of the worm, thereby simplifying the structure thereof and improving polishing accuracy of each of the tooth faces.

DESCRIPTION OF EMBODIMENT

Figure 12:
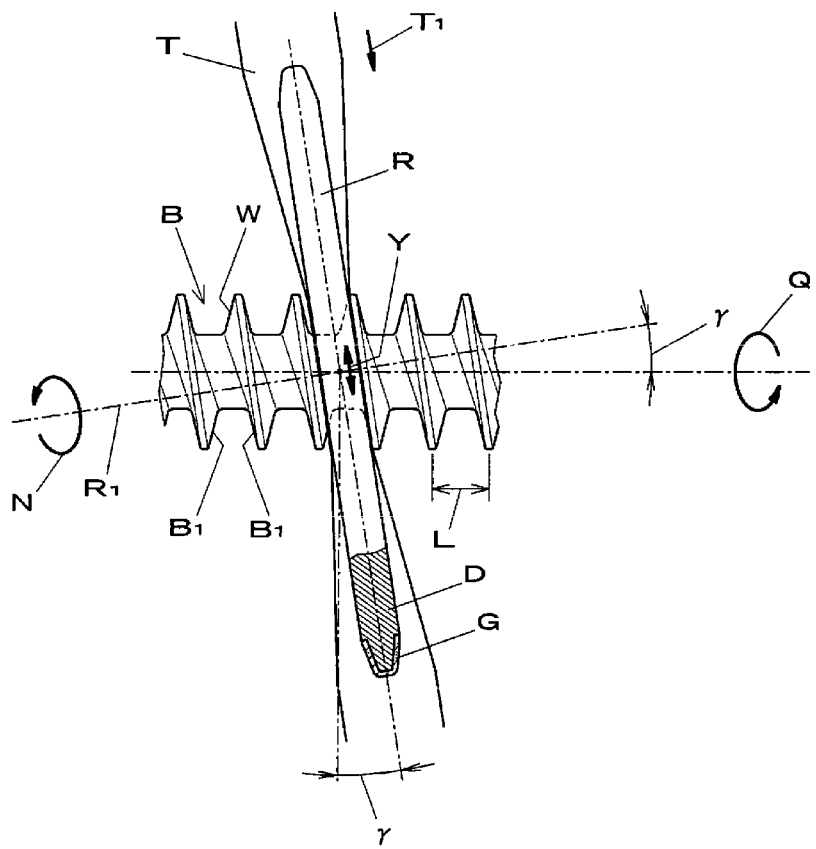
FIG. 12 is an explanatory partial rear view of the embodiment in actuation according to the present invention.

FIGS. 1 to 14D show an embodiment according to the present invention. FIG. 12 shows a detail of a worm W, wherein a worm tooth is formed in a helical or spiral "thread like" fashion. A tooth space B is found between adjacent spirals of the worm tooth, between opposing tooth faces B1. In this embodiment, as shown in FIGS. 1, 2, 3, 4, 6 and 11, the embodiment roughly includes a retention mechanism 1 which rotatably retains the worm W, a rotation mechanism 2 which rotates the worm W with an axis W1 as the center, a tape transfer mechanism 3 which continuously or intermittently transfers a polishing tape T, a tape insertion and retraction mechanism 4 which advances and retreats the tape transfer mechanism 3 to insert and retract the polishing tape T into and from the tooth space B of the worm W by a pressure contact roll R, a tilting mechanism 5 which tilts a rotational axis R1 of the pressure contact roll R corresponding to a tooth lead angle γ (a lead L, a tooth lead angle γ, a pitch circle radius r, tan γ=L/2πr) of the tooth space B of the worm W, loopback rolls K and K which can transfer and guide the polishing tape T in a tangential direction of the pressure contact roll R, a swing mechanism 6 which linearly swings Y the pressure contact roll R in a tangential direction of the tooth space B of the worm W orthogonal to the rotational axis R1, a switchable pressure contact mechanism 7 comprising a pressure contact roll R which has a a tapered peripheral edge RG having a top edge face RG1 and a pair of slant edge faces RG2 on a periphery of the pressure contact roll R, by both of which the polishing tape T can be bent into a substantially V-shape in cross section, and switchably advances and retreats the pressure contact roll R in the rotational axis R1 direction to switchably pressure contact each of bent portions T2 and T2 of the polishing tape T which is bent into the substantially V-shape in cross section to one tooth face B1 or the other tooth face B1 of the worm W, a tape moving mechanism 8 which moves the polishing tape T in an axis W1 direction of the worm W, and a speed synchronization means 9 which synchronizes a rotating speed Q of the worm W with a moving speed F of the polishing tape T corresponding to a lead L (moving distance in an axial direction relative to one rotation of a conical helix=number of threads Z×pitch t) of the tooth space B of the worm W.

Figure 1:
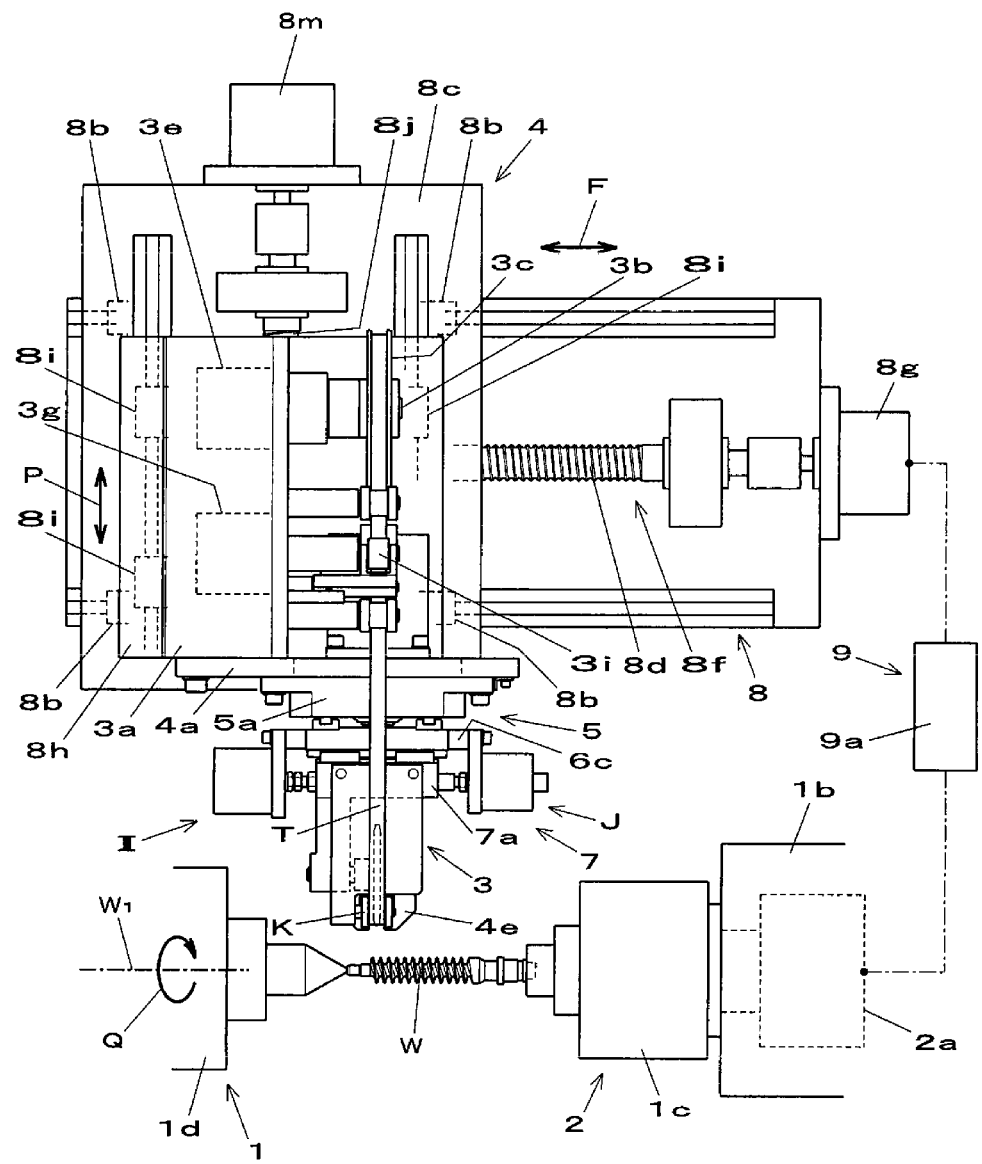
FIG. 1 is an overall plan view of an embodiment according to the present invention.
Figure 2:
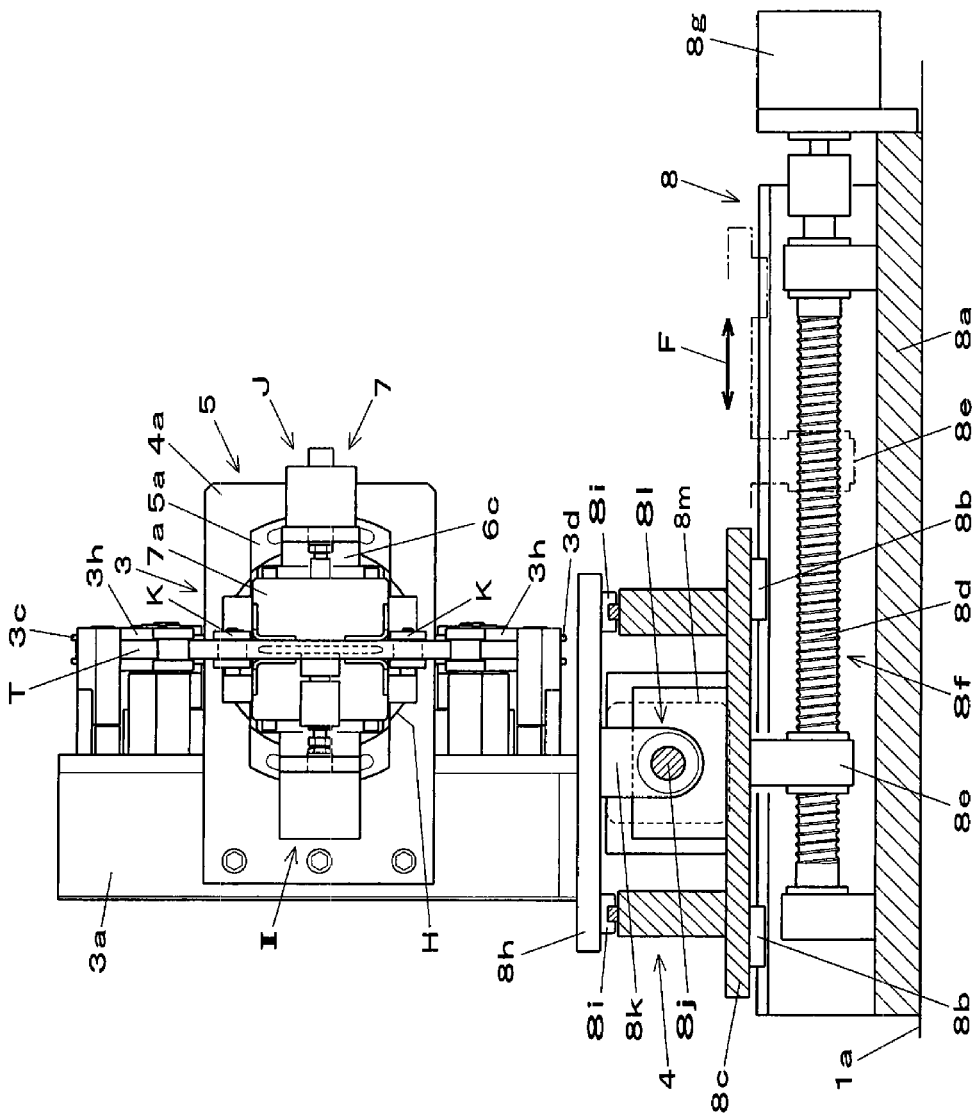
FIG. 2 is a front cross sectional view of the embodiment according to the present invention.

In this case, as shown in FIGS. 1 and 2, in the above retention mechanism 1 and the rotation mechanism 2, a retention stand 1b is arranged in a standing manner on a machine body 1a, and a chuck 1c which can detachably retain one end of the worm W is arranged on the retention stand 1b, and a tail stock 1d which can rotatably retain the other end of the worm W is arranged. Thereby, the chuck 1c is configured to rotate by the rotation control motor 2a and to rotate the worm W.

In this case, as shown in FIGS. 1, 2, 3, 4, 5 and 6, in the tape transfer mechanism 3, a fully wound reel 3c around which an unused polishing tape T is wound and an empty reel 3d are rotatably arranged on a mounting base 3a by a pair of support shafts 3b and 3b. The polishing tape T unwound from the fully wound reel 3c is wound around the empty reel 3d by way of a periphery of the pressure contact roll R of the tape insertion and retraction mechanism 4. The fully wound reel 3c unwindingly rotates by means of an unwinding motor 3e, and the empty reel 3d windingly rotates by means of a winding motor 3f. Transfer rolls 3h and 3h and pinching rolls 3i and 3i which feed rotate the polishing tape T by means of the transfer motors 3g and 3g are arranged between the fully wound reel 3c and the pressure contact roll R, and between the pressure contact roll R and the empty reel 3d. This continuously or intermittently transfer T1 the polishing tape T from the fully wound reel 3c to the empty reel 3d via the pressure contact roll R at a comparatively low speed by a cooperative operation of the unwinding motor 3e, the winding motor 3f and the transfer motors 3g and 3g.

Figure 6:
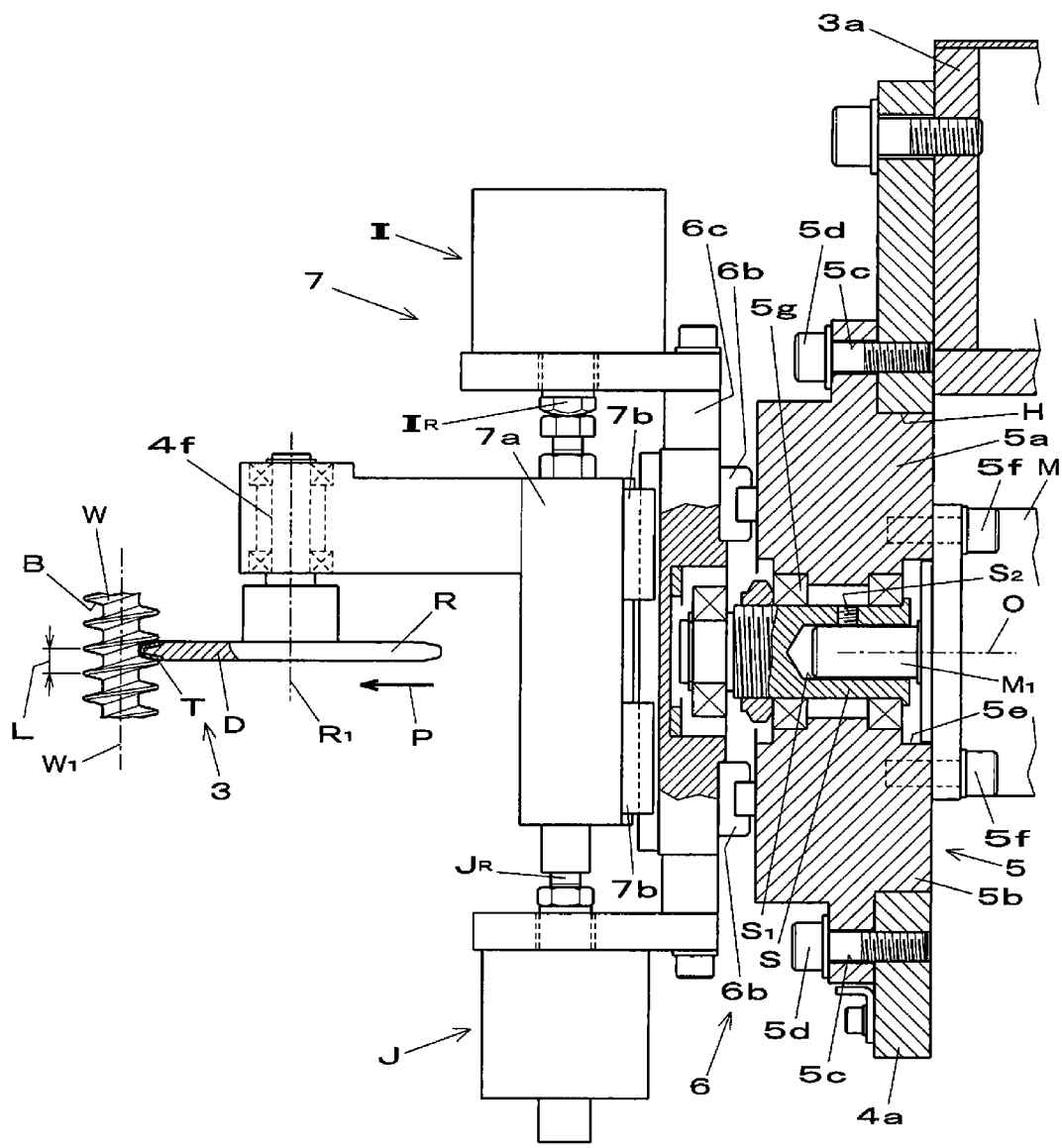
FIG. 6 is a partially enlarged plan cross sectional view of the embodiment according to the present invention.
Figure 7:
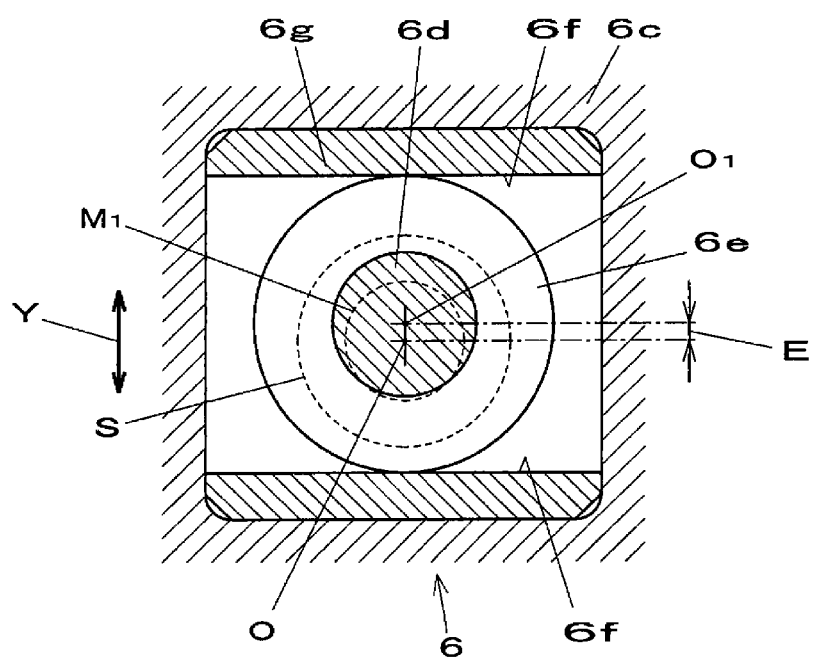
FIG. 7 is a partially enlarged front cross sectional view of the embodiment according to the present invention.
Figure 8:
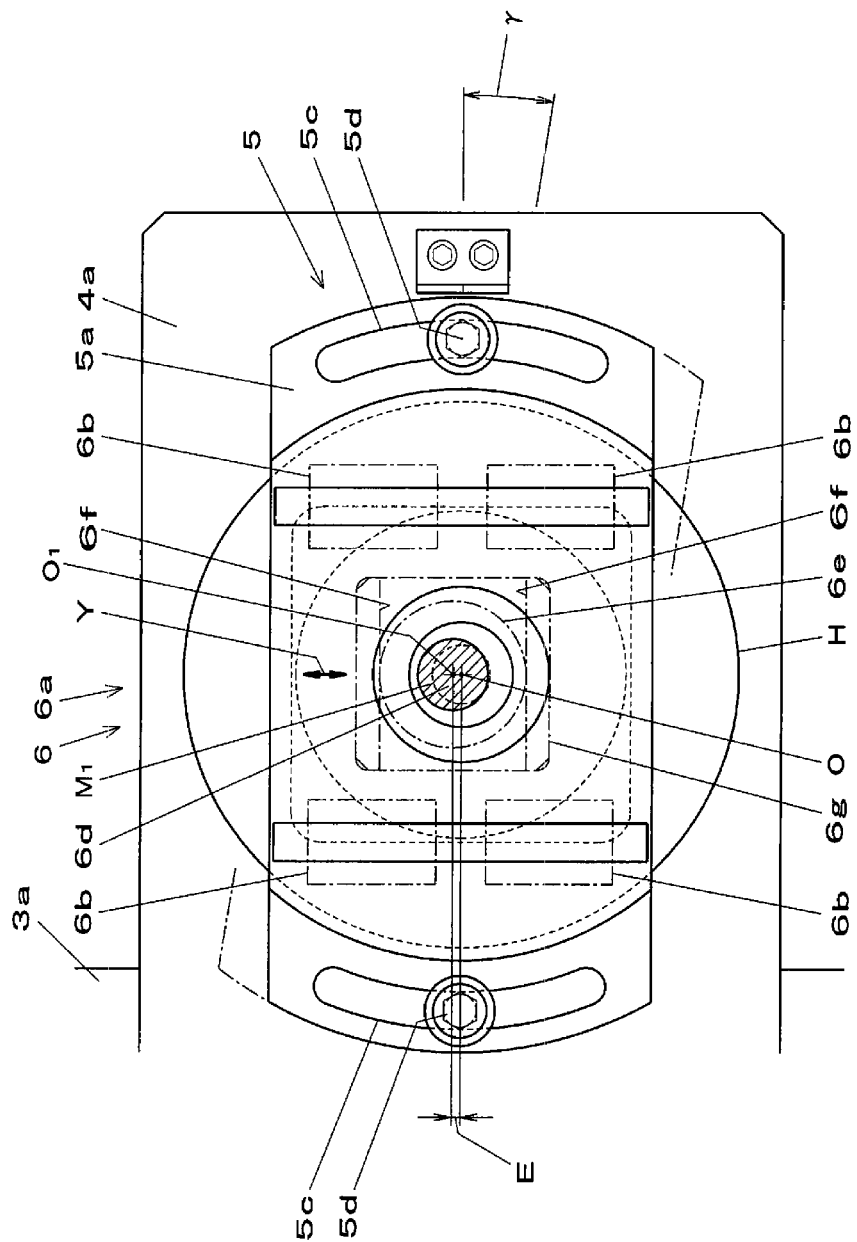
FIG. 8 is a partially enlarged front cross sectional view of the embodiment according to the present invention.
Figure 9:
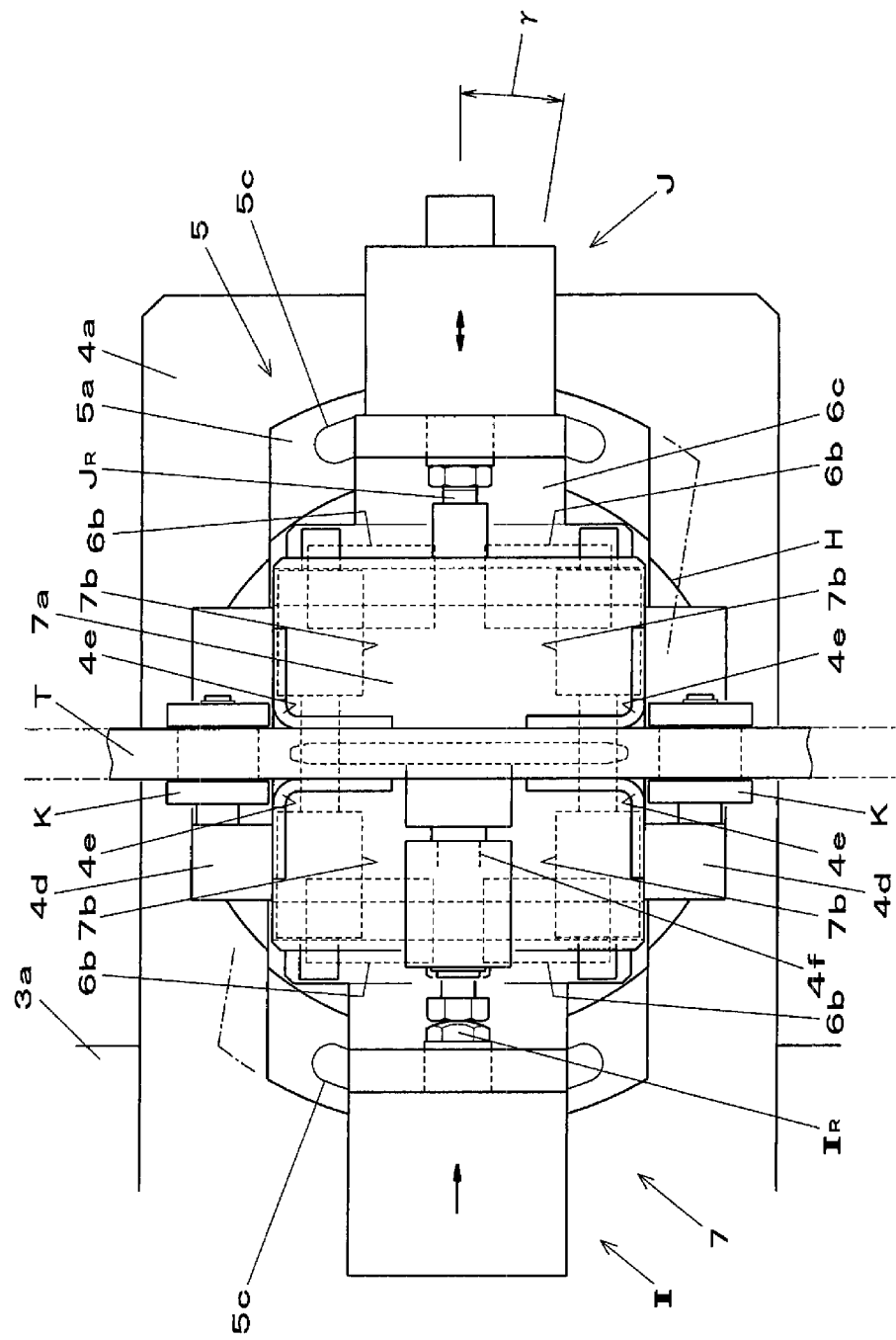
FIG. 9 is a partially enlarged front view of the embodiment according to the present invention.
Figure 10:
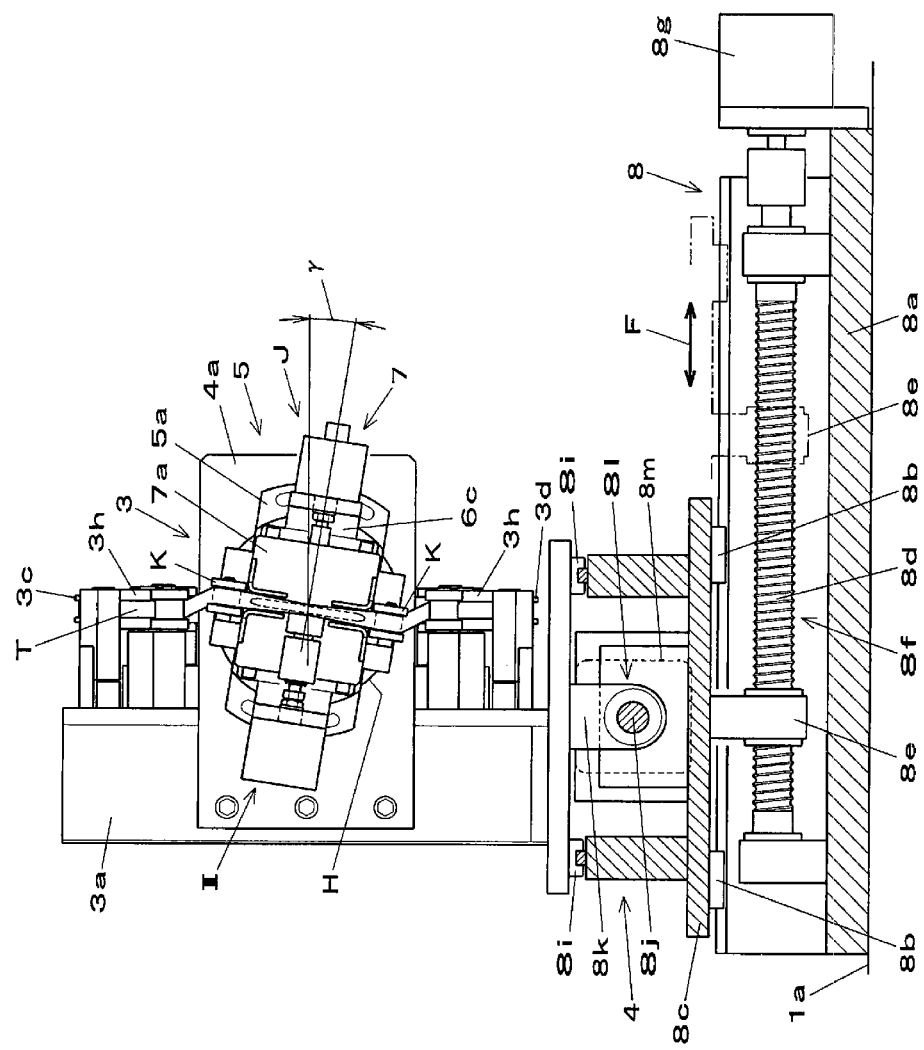
FIG. 10 is a front cross sectional view of the embodiment in use according to the present invention.
Figure 11:
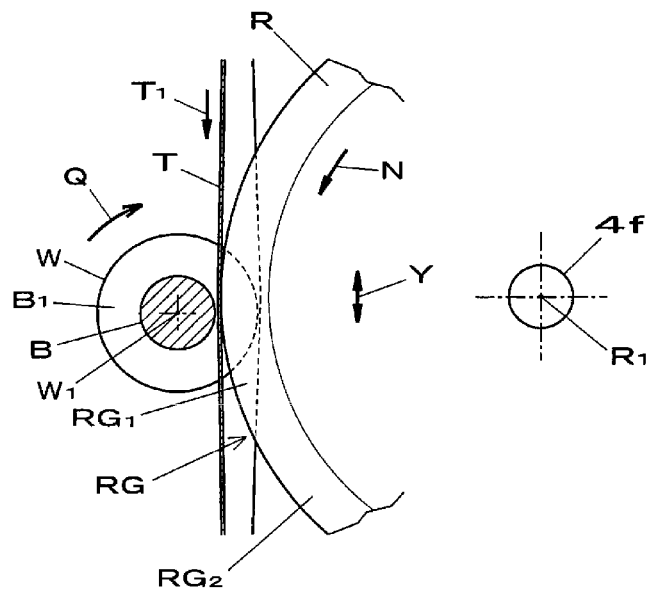
FIG. 11 is an explanatory partial side cross sectional view of the embodiment in actuation according to the present invention.
Figure 13:
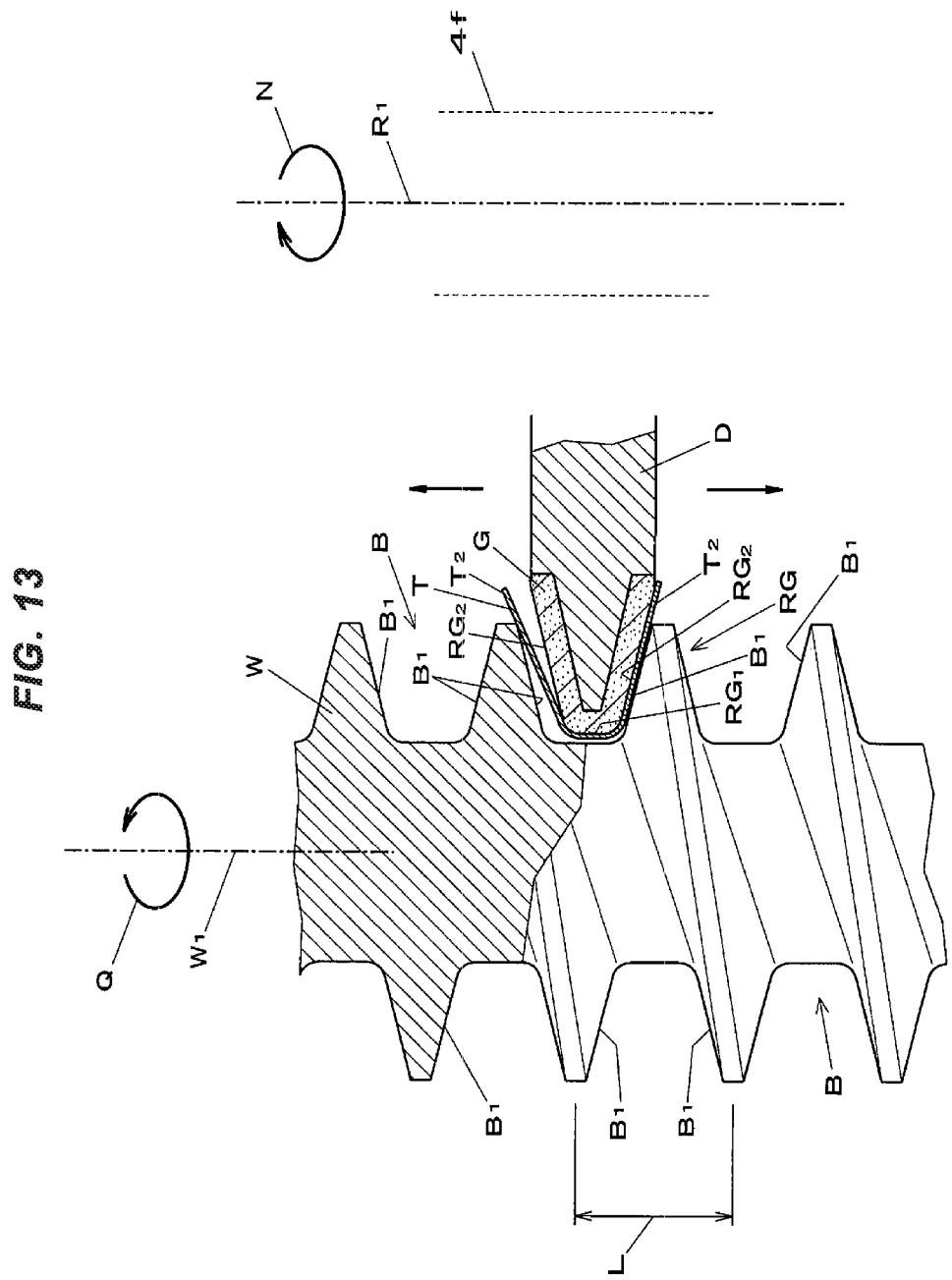
FIG. 13 is an explanatory partial plan view of the embodiment in actuation according to the present invention.

In this case, as shown in FIGS. 6 and 13, the pressure contact roll R is made of a metal material D, and is configured by providing an elastic pressure contact member G which is made of a rubber and has the top edge face RG1 and a pair of slant edge faces RG2 and RG2 on the tapered edge RG of the metal material D, by both of which the polishing tape T can be bent into a substantially V-shape in cross section.

Figure 3:
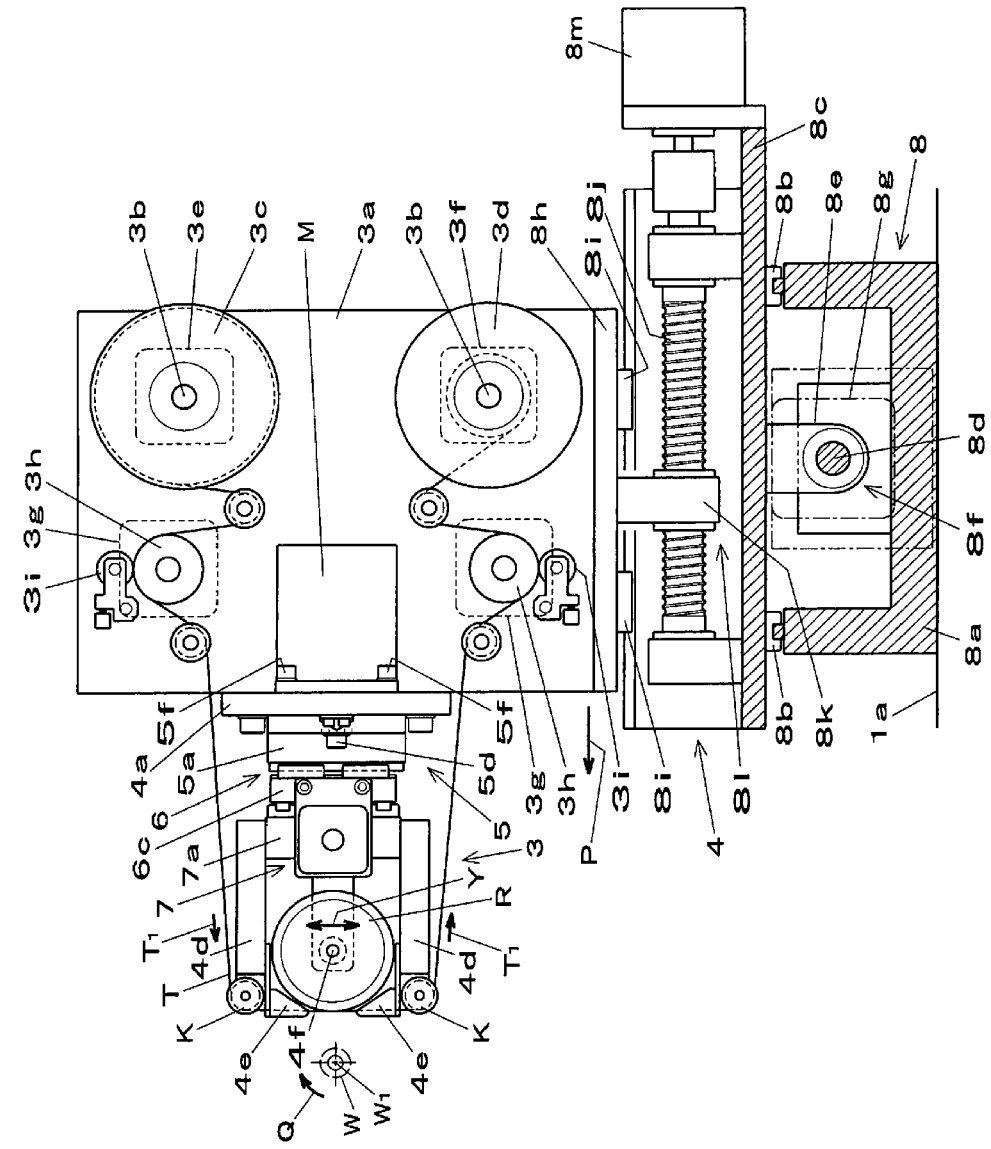
FIG. 3 is an overall side cross sectional view of the embodiment according to the present invention.

Further, in this case, as shown in FIGS. 1, 2 and 3, in the tape insertion and retraction mechanism 4 and the tape moving mechanism 8 are configured, a moving base 8a is movably arranged on the machine body 1a, and a sliding stand 8c is movably arranged on the moving base 8a in the axis W1 direction of the worm W via a sliding portion 8b. The polishing tape T is moved by a ball screw mechanism 8f composed of a screw shaft 8d and a nut 8e and by a movement control motor 8g in the axis W1 direction of the worm W via the sliding stand 8c. The sliding stand 8h is movably arranged on the sliding stand 8c in a direction orthogonal to the axis W1 direction of the worm W by a sliding portion 8i. The mounting base 3a of the taper transfer mechanism 3 is movably arranged on the sliding stand 8h in a direction orthogonal to the axis W1 direction of the worm W. The polishing tape T is advanced and retreated P by a ball screw mechanism 8l composed of a screw shaft 8j and a nut 8k and a movement control motor 8m via the mounting base 3a in a direction orthogonal to the axis line W1 direction of the worm W. During polishing, the polishing tape T is inserted into the tooth space B of the worm W with the pressure contact roll R by means of the tape insertion and retraction mechanism 4. After polishing, the polishing tape T is retracted from the tooth space B of the worm W by means of the tape insertion and retraction mechanism 4, and the polishing tape T is inserted and retracted into and from the tooth space B of the worm W by means of the pressure contact roll R.

In this case, the polishing tape T has a structure in which polishing grains having a predetermined grain size, made such as of aluminum oxide, chrome oxide, silicon carbide, and diamond are coated or bound on a base material such as a polyester film, metal and cloth.

Further, as shown in FIGS. 4, 5, 6, 9 and 10, in the tilting mechanism 5, a turning member 5a is turnably arranged on a mounting member 4a by fitting of an inner peripheral surface of a guide hole H and an outer peripheral surface of a guide convex 5b which is provided in the turning member 5a, with a rotational axis O intersecting with the axis W1 of the worm W as the center. Arcuate holes 5c and 5c are formed in the turning member 5a, and the turning member 5a is positioned on and fixed to the mounting member 4a by mounting bolts 5d and 5d through the arcuate holes 5c and 5c. The pressure contact roll R is arranged on the turning member 5a via the tape insertion and retraction mechanism 4, the swing mechanism 6 and the switchable pressure contact mechanism 7. The turning member 5a of the tilting mechanism 5 is turnably adjusted corresponding to the tooth lead angle γ of the tooth space B of the worm. This tilts the rotational axis R1 of the pressure contact roll R corresponding to the tooth lead angle γ of the tooth space B of the worm W.

Further, in this case, as shown in FIGS. 4, 5, 6, 7, 8, 9 and 10, in the swing mechanism 6, an eccentric mechanism 6a is used. The eccentric mechanism 6a is linearly swingably arranged on the turning member 5a in a vertical direction of a tangential direction of the tooth space B of the worm W orthogonal to the rotational axis R1 of the pressure contact roll R by means of sliding portions 6b, 6b, 6b and 6b. A fitting hole 5e is formed in the guide convex 5b of the turning member 5a, and a linear swing motor M is mounted on the turning member 5a with a bolt 5f by fitting the linear swing motor M into the fitting hole 5e. A coupling shaft S is rotatably supported on the turning member 5a by a bearing 5g with the rotational axis O as the center. A main shaft M1 of the linear swing motor M is fitted into an inner hole S1 of the coupling shaft S and mounted thereon by a bolt S2. An eccentric shaft 6d having an eccentric axis O1 of eccentricity E with respect to the rotational axis O of the main shaft M1 is provided in the coupling shaft S, and an eccentric wheel 6e having a ball bearing shape is rotatably provided in the eccentric shaft 6d. A bridge member 6g having a trench steel shape in entire shape is provided on the eccentric stand 6c, and a pair of opposing contact surfaces 6f and 6f with which the eccentric wheel 6e comes into contact are provided on an inner surface of a flange-shaped portion of the bridge member 6g. The pressure contact roll R is linearly swinged Y in the rotational axis R1 direction by the eccentric shaft 6d, the eccentric wheel 6e, the contact surfaces 6f and 6f of the bridge member 6g and the sliding portions 6b, 6b, 6b and 6b of the swing mechanism 6 by a driving force of the linear swing motor M.

Figure 4:
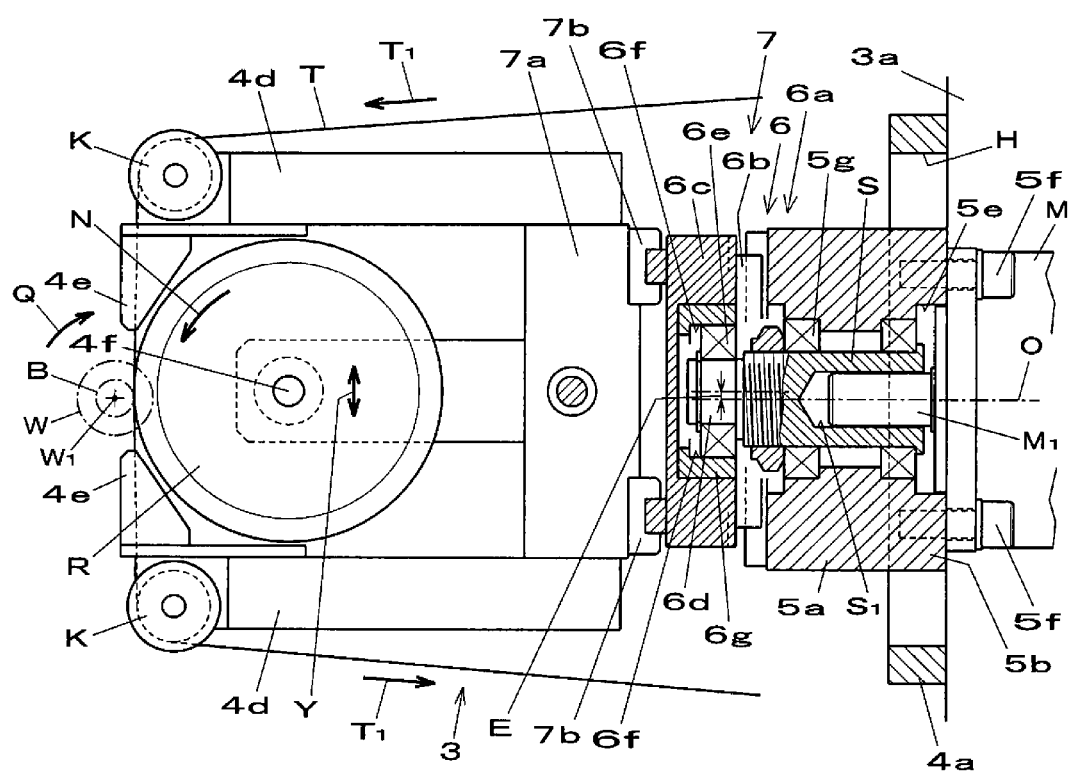
FIG. 4 is a partially enlarged side cross sectional view of the embodiment according to the present invention.
Figure 5:
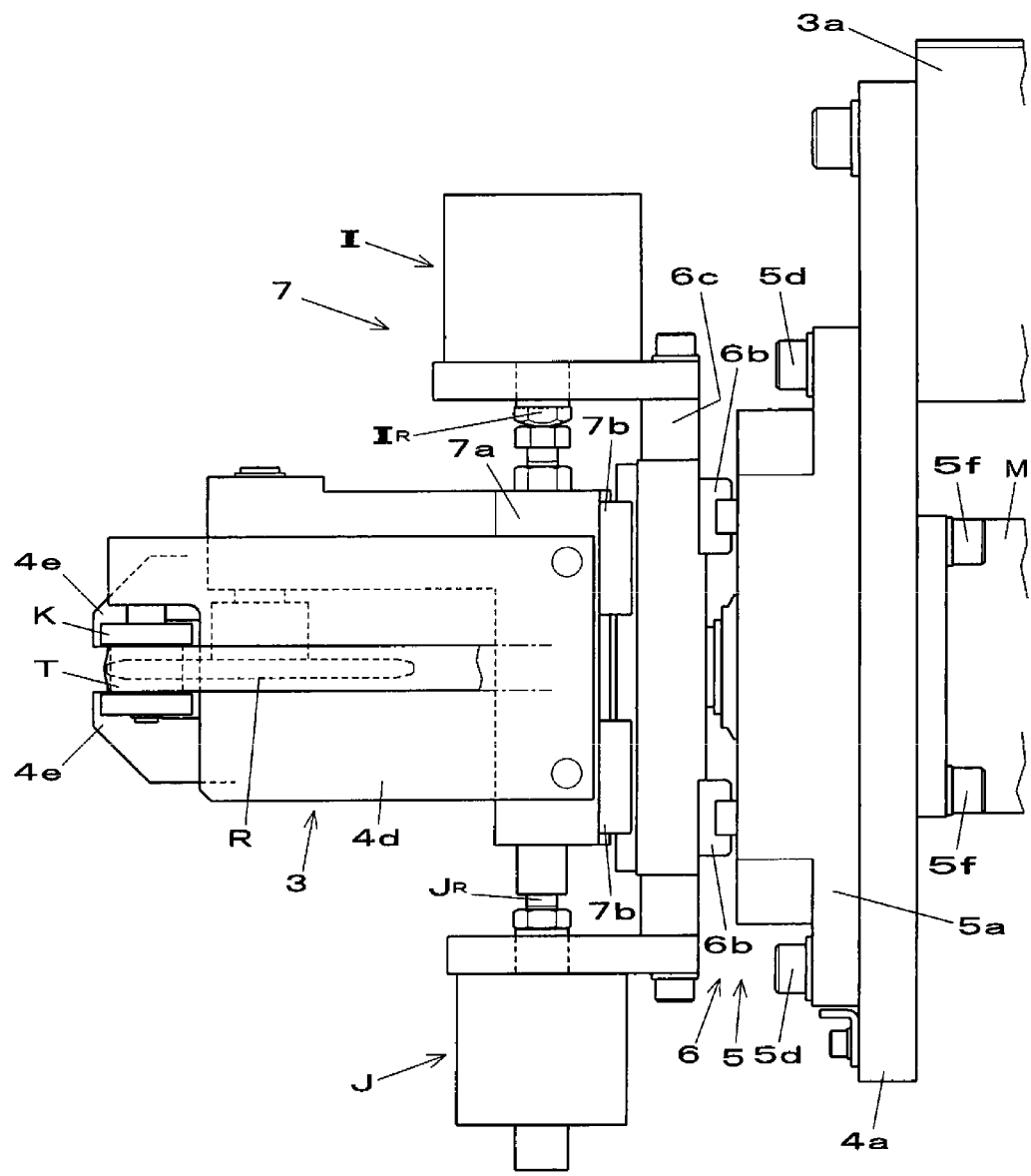
FIG. 5 is a partially enlarged plan view of the embodiment according to the present invention.

Further, in this case, as shown in FIGS. 4, 5 and 6, in the switchable pressure contact mechanism 7. The mounting member 4a is arranged on a front surface of the mounting base 3a, and a switchable moving stand 7a is advancably and retreatably provided on the mounting member 4a via the tilting mechanism 5 and the eccentric stand 6c of the swing mechanism 6 in the rotational axis R1 direction of the pressure contact roll R by sliding portions 7b and 7b. Bifurcated members 4d and 4d are arranged on the switchable moving stand 7a, and a pair of right and left guide pieces 4e and 4e which can transfer and guide both side edges of the polishing tape T are vertically arranged in the bifurcated members 4d and 4d. A pair of upper and lower loopback rolls K and K are provided on each of the bifurcated members 4d and 4d, and a guide shaft 4f is laterally rotatably provided on the switchable moving stand 7a in a cantilever state. The pressure contact roll R is arranged at a leading end of the guide shaft 4f, with the rotational axis R1 being substantially kept horizontal. The pressure contact roll R is accompanyingly rotated N with the transfer T1 of the polishing tape T. The polishing tape T is transferred and guided in a tangential direction of the outer peripheral surface of the pressure contact roll R by way of the loopback rolls K and K. The polishing tape T between the loopback rolls K and K is pressure contacted to a tooth face B1 of the worm W at the periphery of the pressure contact roll R. Further, the switchable moving stand 7a is advancably and retreatably provided on the eccentric stand 6c in the rotational axis R1 direction of the pressure contact roll R via the sliding portions 7b, 7b, 7b and 7b. A pair of opposing cylinder mechanism I and J which advance and retreat the switchable moving stand 7a are provided. The pressure contact roll R is switchably advanced and retreated in the rotational axis R1 direction and each of the bent portions T2 and T2 of the polishing tape T which is bent into the substantially V-shape in cross section is switchably pressure contacted to the one tooth face B1 or the other tooth face B1 of the worm W.

In this case, as shown in FIGS. 5, 6 and 14A, 14B, 14C and 14D, as the pair of opposing cylinder mechanisms I and J, a single-rod type is adopted in the one cylinder mechanism I, and a double-rod type is adopted in the other cylinder mechanism J. A rod IR of the single-rod type cylinder mechanism I and the switchable moving stand 7a are provided in an abuttable and separatable manner, and a rod JR of the double-rod type cylinder mechanism J and the switchable moving stand 7a are coupled with and fixed to each other. The reason why the double-rod type is adopted as the other cylinder mechanism J is that in the case of the single-rod type, thrust of push and pull of the rod are different, and that it is troublesome to regulate a pressure contact force of each of the one tooth face B1 or the other tooth face B1. By contrast, in the case of the double-rod type, the thrust of push and pull of the rod JR can be made same, and thus it provides good regulation and control of the pressure contact force of each of the one tooth face B1 and the other tooth face B1.

Figure 14A:
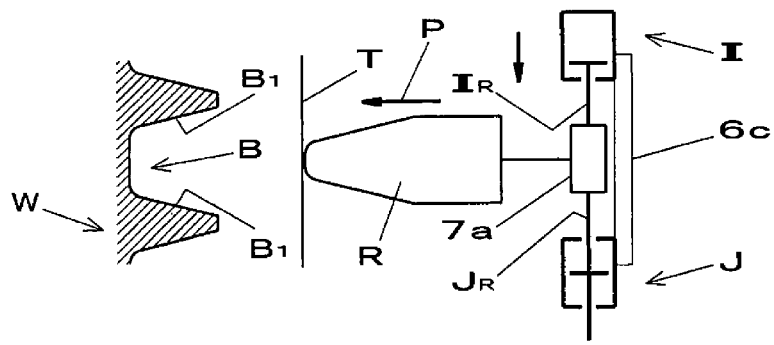
FIGS. 14A to 14D are explanatory partial plan cross sectional views of the embodiment in actuation according to the present invention.
Figure 14B:
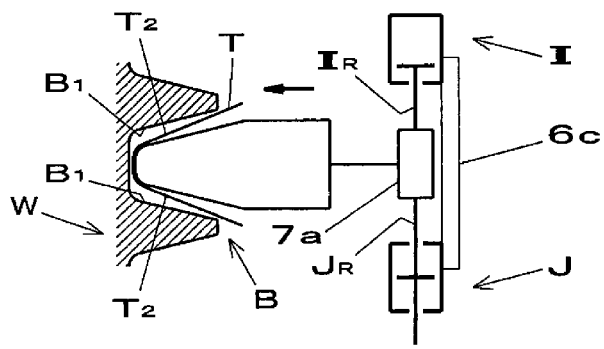
Figure 14C:
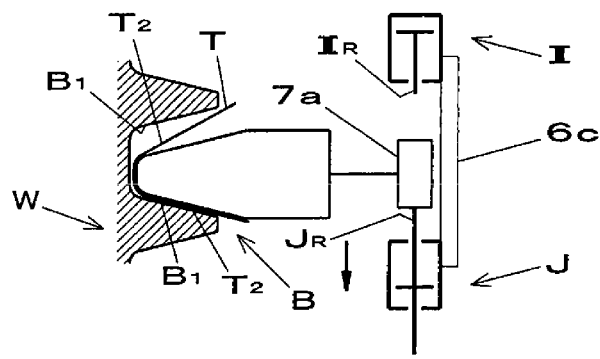
Figure 14D:
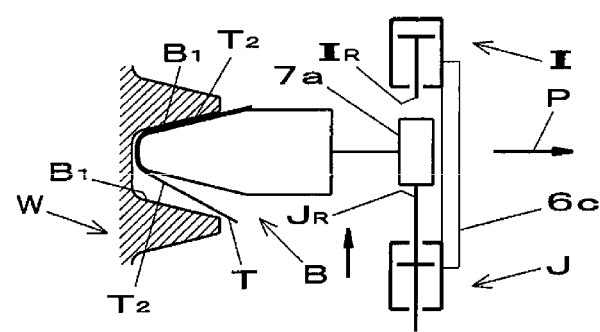

More specifically, first of all, as shown in FIG. 14A, the rod IR of the single-rod type cylinder mechanism I advances and the rod JR of the double-rod type cylinder mechanism J advances concurrently therewith. The thrust of the rod IR of the cylinder mechanism I is set to be greater than the thrust of the rod JR of the double-rod type cylinder mechanism J, the rod IR acts as a stopper for the thrust of the cylinder mechanism I, and the pressure contact roll R is positioned at an intermediate position of the tooth space B. Next, as shown in FIG. 14B, at this intermediate position, the pressure contact roll R and the polishing tape T advance P and are inserted into the tooth space B of the worm W by the tape insertion and retraction mechanism 4, and the rod IR of the single-rod type cylinder mechanism IR retracts serving as a stopper. Then, as shown in FIG. 14C, at this inserted state, the pressure contact roll R retreats in the rotational axis R1 direction accompanied by the retraction of the rod JR of the double-rod type cylinder mechanism J, and one bent portion T2 of the polishing tape T which is bent into the substantially V-shape in cross section pressure contacts to the one tooth face B1 of the worm W. Under this condition, the one tooth face B1 is polished by the polishing tape T. Upon completion of the polishing of the one tooth face B1, as shown in FIG. 14D, at this inserted state, the pressure contact roll R switchably retreats in the rotational axis R1 direction accompanied by the advance of the rod JR of the double-rod type cylinder mechanism J, and the other bent portion T2 of the polishing tape T which is bent into the substantially V-shape in cross section pressure contacts to the other tooth face B1 of the worm W. Under this condition, the other tooth face B1 is polished by the polishing tape T, and the pressure contact roll R and the polishing tape T retreat P from the tooth space B of the worm W by the tape insertion and retraction mechanism 4.

Further, as shown in FIG. 1, the above speed synchronization means 9 includes the rotation control motor 2a which rotates the worm W, the movement control motor 8g which moves the polishing tape T, and a synchronization control portion 9a which synchronously controls a rotating speed Q of the rotation control motor 2a and a rotating speed of the movement control motor 8g. Although a specific circuit configuration of the synchronization control portion 9a is omitted, a personal computer is used, for example, and synchronizes the rotating speed Q of the worm W with the moving speed F of the polishing tape T corresponding to the lead L of the tooth space B of the worm W.

As shown in FIGS. 1, 2, 4, 6, 11, 12, 13, 14A, 14B, 14C and 14D, the embodiment is configured as above. Thus, the worm W is rotatably retained by the retention mechanism 1, and the worm W is rotated by the rotation mechanism 2 with an axis W1 as the center. The polishing tape T is continuously or intermittently transferred T1 by the tape transfer mechanism 3. The polishing tape T is inserted into the tooth space B of the worm by the pressure contact roll R by means of the tape insertion and retraction mechanism 4. The rotational axis R1 of the pressure contact roll R is tilted by the tiling mechanism 5 corresponding to the tooth lead angle γ of the tooth space B of the worm W. The polishing tape T is transferred and guided in a tangential direction of the pressure contact roll R by way of the loopback rolls K and K, and the pressure contact roll R is linearly swinged Y in a tangential direction of the tooth space B orthogonal to the rotational axis R1 by the swing mechanism 6. More specifically, the linear swing Y is set, for example, to Y=2 mm (E=1 mm). The polishing tape T is bent into the substantially V-shape in cross section by the top edge face RG1 and the tapered peripheral edge RG having the pair of slant edge faces RG2 and RG2 on the periphery of the pressure contact roll R. The pressure contact roll R is switchably advanced and retreated in the rotational axis R1 direction, and each of the bent portions T2 and T2 of the polishing tape T which is bent into the substantially V-shape in cross section by the tapered peripheral edge RG is switchably pressure contacted to each of the one tooth face B1 or the other tooth face B1 of the worm W. The polishing tape T is moved in the axis W1 direction of the worm W by the tape moving mechanism 8, and the rotating speed Q of the worm W and the moving speed F of the polishing tape T are synchronized corresponding to the lead L of the tooth space B of the worm W by the speed synchronization means 9. As a result, the tooth faces B1 and B1 of the worm W can be polished by the polishing tape T by a combined operation of the rotation of the worm W, the transfer T1 of the polishing tape T, the linear swing motion Y in the tangential direction of the tooth space B of the worm W. The polishing tape T is moved in conformity to the lead L of the tooth space B of the worm W The movement of the polishing tape T which is synchronized with the rotating speed Q of the worm W, and the polishing tape T is securely pressure contacted to the tooth faces B1 and B1 of the worm W by the tape insertion and retraction mechanism 4 and the switchable pressure contact mechanism 7. This allows secure polishing of the tooth face B1 with the polishing tape T by the continuous or intermittent transfer T1 of the polishing tape T and the linear swing motion Y in a tangential direction of the tooth space B of the worm W, which improves polishing precision, and the surface roughness of the tooth face B1, thereby improving polishing workability of the tooth face B1.

Further, in this case, as shown in FIGS. 5 and 13, the tapered peripheral edge RG of the pressure contact roll R is provided with the elastic pressure contact ring member G having the top edge face RG1 and the pair of slant edge faces RG2 and RG2, by both of which the polishing tape T can be bent into the substantially V-shape in cross section. This buffers a pressure contact force between the bent portion T2 and the tooth face B1 by the slant edge face RG2 of the polishing tape T, which improves the surface roughness of the tooth face, thereby allowing good polishing of the tooth face B1 of the worm W. Further, in this case, as shown in FIGS. 5, 14A, 14B, 14C and 14D, as the switchable pressure contact mechanism 7, the pressure contact roll R is arranged on the switchable moving stand 7a, the switchable moving stand 7a is advancably and retreatably provided in the rotational axis R1 direction of the pressure contact roll R, and the pair of opposing cylinder mechanism I and J which advances and retreats the switchable moving stand 7a is provided. As a result, this allows switchable advance and retreat of the pressure contact roll R in the rotational axis R1 direction by the pair of opposing cylinder mechanisms, thereby switchably pressure contacting each of the bent portions T2 and T2 of the polishing tape T which is bent into the substantially V-shape in cross section to each of the one tooth face B1 or the other tooth face B1 of the worm W. This allows good pressure contact of the polishing tape T to the one tooth face B1 or the other tooth face B1. Further, in this case, the swing mechanism 6 includes the eccentric mechanism 6a which linearly swings Y the pressure contact roll R in the tangential direction of the tooth space B orthogonal to the rotational axis R1. This simplifies the structure of the swing mechanism 6.

Further, in this case, the speed synchronization means 9 includes the rotation control motor 2a which rotates the worm W, the movement control motor 8g which moves the polishing tape T, and the synchronization control portion 9a which synchronously controls the rotating speed Q of the rotation control motor 2a and the rotating speed of the movement control motor 8g. As a result, this allows synchronization of the rotating speed Q of the worm W with the moving speed F of the polishing tape T corresponding to the lead L of the tooth space B of the worm W, which allows secure contact movement of the polishing tape T in conformity to the lead L of the tooth space B, thereby simplifying the structure of the speed synchronization means 9 and improving polishing precision of each of the tooth faces B1 and B1.

The present invention is not necessarily limited to the aforesaid embodiments, but may be designed by appropriately modifying the structures of the retention mechanism 1, the rotation mechanism 2, the tape transfer mechanism 3, the tape insertion and retraction mechanism 4, the tilting mechanism 5, the swing mechanism 6, the switchable pressure contact mechanism 7, the tape movement mechanism 8, the speed synchronization means 9, the loopback rolls K and K, and the pressure contact roll R.

Further, while for example, in the aforesaid embodiment, the dry type polishing structure is adopted, instead thereof, so-called, a wet type polishing structure may sometimes be adopted which supplies a working fluid containing free abrasive grains made of various materials and a chemical agent or a lubricating agent are supplied between the worm W and the polishing tape T. Moreover, as the speed synchronization means 9, a mechanical synchronous rotation mechanism similar to a change gear mechanism may sometimes be adopted which is used in a lead screw mechanism of a lathe turning machine. Alternatively, the speed synchronization means 9 may be designed by selecting either one depending on the kinds of the worm W and the polishing conditions.

As mentioned above, the desired object can be sufficiently achieved.

REFERENCE SIGNS LIST

W worm
W1 axis
T polishing tape
T1 transfer
T2 bent portion
R pressure contact roll
R1 rotational axis
RG tapered peripheral edge
RG1 top edge face
RG2 slant edge face
B tooth space
B1 tooth face L lead
γ tooth lead angle
K loopback roll
G pressure contact ring member
Y linear swing operation
Q rotating speed
F moving speed
I cylinder mechanism
J cylinder mechanism
1 retention mechanism
2 rotation mechanism
2a rotation control motor
3 tape transfer mechanism
4 tape insertion and retraction mechanism
5 tilting mechanism
6 swing mechanism
6a eccentric mechanism
7 switchable pressure contact mechanism
7a switchable moving stand
8 tape moving mechanism
8g movement control motor
9 speed synchronization means
9a synchronization control portion

The invention claimed is:

1. A worm polishing method for polishing tooth faces of a gear tooth of the worm with a polishing tape, comprising the steps of:
rotatably retaining a worm and rotating the worm about a rotational axis of the worm;
continuously or intermittently transferring the polishing tape from a source to pass proximate to the worm;
inserting and retracting the polishing tape into and from a tooth space between opposing tooth faces of the worm by a pressure contact roll, wherein a rotational axis of the pressure contact roll is tilted corresponding to a tooth lead angle of the tooth space of the worm, and the polishing tape is transferred and guided along a perimeter of the pressure contact roll, wherein the pressure contact roll has a tapered peripheral edge defined by a top edge and a pair of slant edge faces on a periphery of the pressure contact roll, and the polishing tape is bent into a substantially V-shape in cross section by the tapered peripheral edge of the pressure contact roll forming a bent portion of the polishing tape along each of the slant edges;
swinging the pressure contact roll transversely across the tooth space of the worm;
alternately advancing and retreating the pressure contact roll along the rotational axis direction, and alternately pressure contacting each of the bent portions of the polishing tape against the tooth faces on opposing sides of the tooth space of the worm;
moving the polishing tape along an axial direction of the worm;
synchronizing a rotating speed of the worm with a moving speed of the polishing tape such that the polishing tape tracks a lead of the tooth space of the worm;
whereby the tooth faces of the worm are polished by a combined operation of the rotation of the worm, the transfer of the polishing tape, the swing motion of the pressure contact roll and the movement of the polishing tape synchronized with the rotating speed of the worm.

2. A worm polishing device for polishing tooth faces of a gear tooth of the worm with a polishing tape, comprising:
a retention mechanism which rotationally retains a worm;
a rotation mechanism which rotates the worm about a rotational axis of the worm;
a tape transfer mechanism which continuously or intermittently transfers a polishing tape from a source;
a tape insertion and retraction mechanism which advances and retreats the tape transfer mechanism, and inserts and retracts the polishing tape into and from a tooth space between opposing tooth faces of the worm with a pressure contact roll;
a tilting mechanism which tilts a rotational axis of the pressure contact roll corresponding to a tooth lead angle of the tooth space of the worm;
loopback rolls which can transfer and guide the polishing tape in a tangential direction of the pressure contact roll;
a swing mechanism which linearly swings the pressure contact roll transversely across the tooth space of the worm;
a switchable pressure contact mechanism having a pressure contact roll which has a tapered peripheral edge having a top edge face and a pair of slant edge faces formed on a periphery of the pressure contact roll, by both of which the polishing tape can be bent into a substantially V-shape in cross section, wherein the switchable pressure contact mechanism alternately advances and retreats the pressure contact roll along the rotational axis direction to alternately pressure contact each of the bent portions of the polishing tape against the tooth faces on opposing sides of the tooth space of the worm;
a tape moving mechanism which moves the polishing tape along an axial direction of the worm; and
a speed synchronization means which synchronizes a rotating speed of the worm with a moving speed of the polishing tape such that the polishing tape tracks a lead of the tooth space of the worm.

3. The worm polishing device according to claim 2, wherein an elastic pressure contact ring member is provided on the tapered peripheral edge of the pressure contact roll, and has the top edge face and the pair of slant edge faces.

4. The worm polishing device according to claim 2, wherein the switchable pressure contact mechanism comprises a switchable moving stand, and a pair of opposing cylinder mechanisms, and wherein the pressure contact roll is provided on the switchable moving stand, the switchable moving stand is arranged to advance and retreat along the rotational axis direction of the pressure contact roll, and the pair of opposing cylinder mechanisms advance and retreat the switchable moving stand.

5. The worm polishing device according to claim 2, wherein the swing mechanism comprises an eccentric mechanism which linearly swings the pressure contact roll transversely across the tooth space of the worm.

6. The worm polishing device according to claim 2, wherein the speed synchronization means comprises a rotation control motor rotating the worm, a movement control motor moving the polishing tape, and a synchronization control portion which synchronously controls a rotating speed of the rotation control motor and a rotating speed of the movement control motor.

* * * * *